May 5, 1931. F. C. COSEO 1,803,424
BATTERY BOX
Original Filed Oct. 12, 1926
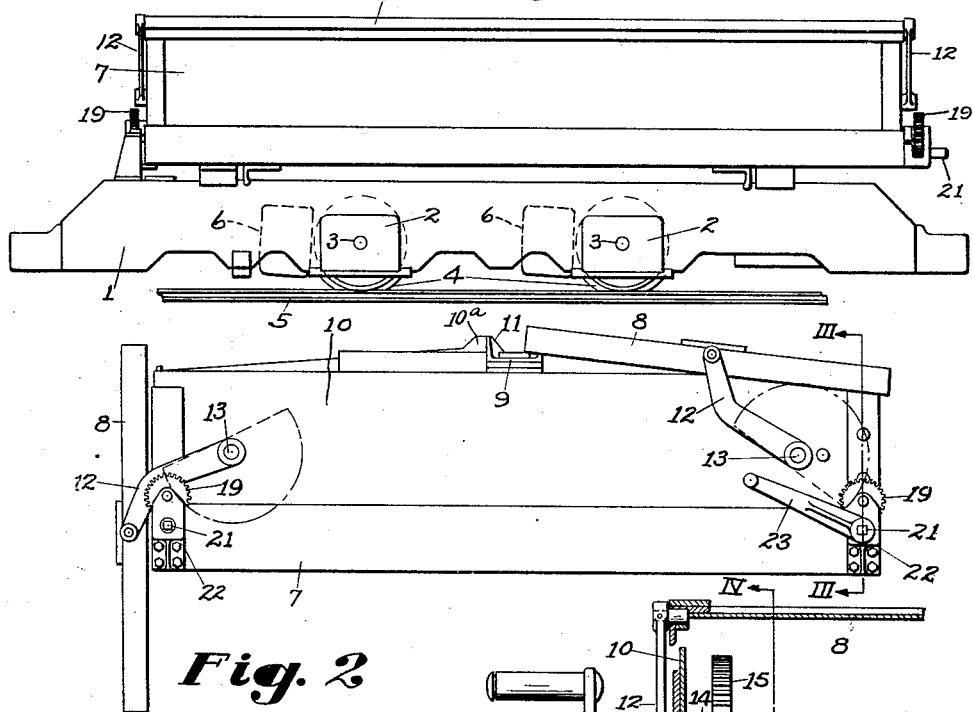
Fig. 1
Fig. 2
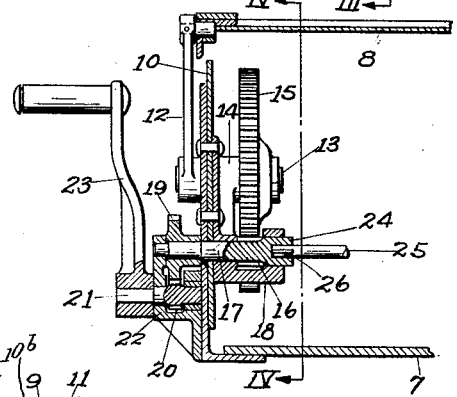
Fig. 3
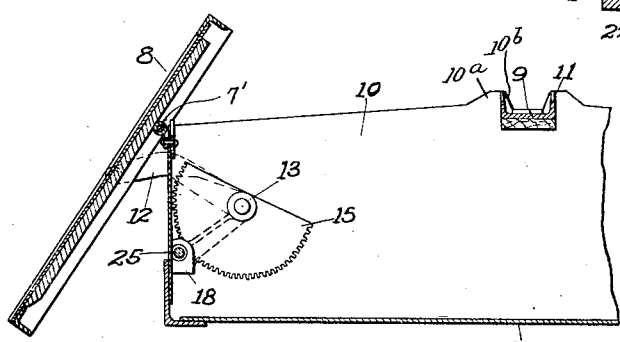
Fig. 4

Patented May 5, 1931

1,803,424

UNITED STATES PATENT OFFICE

FREDERICK C. COSEO, OF COLUMBUS, OHIO, ASSIGNOR TO THE JEFFREY MANUFACTURING COMPANY

BATTERY BOX

Application filed October 12, 1926, Serial No. 141,230. Renewed September 22, 1930.

The present invention relates to certain new and useful improvements in battery box, of the type adapted to use upon an electric locomotive to contain the storage battery from which is derived the electric current for the actuation of the propelling motors.

The especial object of this invention is to provide improved mechanism for the manipulation of the covers of the battery box of a storage locomotive, whereby said covers may be conveniently and expeditiously removed to permit inspection of the battery or returned to closed position.

The means whereby I attain this object are fully set forth in the following specification and illustrated in the accompanying drawing of which Fig. 1 is a side elevation of a locomotive equipped with the devices of my invention.

Fig. 2 is an end elevation, on an enlarged scale, of the battery box shown in Fig. 1.

Fig. 3 is a fragmentary longitudinal sectional view taken along the line III—III of Fig. 2.

Fig. 4 is a fragmentary transverse sectional view taken along the line IV—IV of Fig 3.

Like numerals refer to similar parts in the several figures.

In Fig. 1 of the drawing I have shown a side elevation of a storage battery locomotive of the class to which my invention relates.

As here shown, the numeral 1 refers to the main frame of a locomotive. Suitably mounted in the frame 1 are the journal bearings 2 in which are journaled axles 3 to which are attached the track wheels 4. The track wheels 4 are adapted to travel along the track rails 5, and are actuated by an electric motor 6 mounted within the locomotive frame. The actuating current for the propelling motor is supplied from storage batteries mounted within the battery box 7 supported upon the main frame 1 of the locomotive. As these devices are well understood in the art, and as they form no part in the present invention, further illustration and description of them is not thought to be required at this time.

To protect the batteries within the box 7, I have provided the cover plates 8 which are adapted to rest upon the upper edges of the battery box and upon the channel bar 9 which extends centrally and longitudinally thereof and is supported by the end walls 10 of said box. These plates are equipped with down turned surrounding flanges adapted to telescope over the edges of the box and flanges 11 of the bar 9. These upturned flanges 11 serve the double purpose of stiffening the supporting bar and of providing a channel adapted to receive and conduct away any water which may find its way between the abutting edges of the cover plates 8. In order to assist the inner flanged edges of the cover plates over the flanges 11 during opening or closing movement of the plates 8, inclined surfaces 10a and 10b are provided upon opposite sides of the flanges 11, and upon which the inner edges of the cover plates may slide. In Figure 4 it will be noted that the sides of the battery box 7 adjacent the upper edges are provided with anti-friction rollers 7' designed for guiding the cover plates into closed and opened positions.

Pivotally attached to each end of each cover plate 8 in the longitudinal central line thereof is a hinge arm 12 which is also pivotally attached to the end wall 10 of the battery box, and which affords a swinging connection upon which the cover plates 8 may be moved in parallelism to open or close the battery box. By connecting the arms 12 to the cover or closure 8 at substantially the center of the side edges thereof, this cover or closure is balanced in substantial equilibrium by the arms so as to have a translational body movement imparted thereto in both its opening and closing movements. Each of the arms 12 is rigidly attached to a pivot shaft 13 which extends through the end wall 10 of the battery box and is journaled in a bearing 14 attached to the inner side thereof. It will be observed that the pivots which connect the arms 12 to the cover plates 8 are arranged inwardly of the pivot shafts 13 when the cover plates are arranged in closed positions, thereby causing the cover plates to come to a complete state of rest upon the box or car and relieve the arms 12 of their weight. To the inner end of the shaft 13 is fixed a segmental spur gear 15 which is engaged by a pinion 16 formed integral with the stub shaft 17. The stub shaft 17 is journaled in a bearing 18 formed integral with the bearing 14, and upon its outer end is fixed a spur gear 19 which is engaged by a pinion 20 formed integral with the stud shaft 21. It will be noted that the shaft 17 is arranged outwardly and below the pivotal axis of the arms 12 for a purpose to presently appear. The stub shaft 21 is journaled in a bearing 22 attached to the outer side of the end wall 10, and is squared at its projecting end to receive a removable hand crank 23 whereby rotative motion may be imparted to said stub shaft. This rotative motion is transmitted through a power multiplying device consisting of the pinion 20, gear 19, pinion 16, and segmental gear 15 to the hinge arm 12 to swing it about its axial support. Formed in the stub shaft 17 is a socket 24 into which projects the end of a longitudinally extending shaft 25 which is rotatively connected to said stub shaft by a suitable key 26. The shaft 25 extends from end to end of the battery box and connects the arm swinging mechanism at one end with that at the other. When rotative effort is applied to the crank 23 at one end of the box, the arms 12 at both ends are caused to simultaneously swing about their pivotal supports thereby moving the cover plate 8 in perfect parallelism from closed to open or from open to closed position according to the direction of the rotation of the crank 12. The proportions of these parts are such that when the cover plate 8 is removed from the top of the battery box it will occupy a vertical position at the side of the locomotive with its upper edge at approximately the level of the upper edge of the battery box, in which position it will not interfere with the operation of inspection or adjustment of the contents of the box.

It will be noted in Figure 3 that the spur gears 19 are provided with hubs abutting the end walls 10 which spaces the gears 19 from said walls enough to permit the arms 12 to abut the hubs and limit downward movement of the cover plates 8 at the sides of the car or box. These arms 12 are offset as shown to permit the inner edges of the cover plates to move down a sufficient distance so as not to interfere with the inspection or adjustment of the contents of the car. It is to be particularly noted that the arms 12 sustain the entire weight of the cover plates when they are being moved to open or closed positions as well as when they are in open positions, and that the hubs of the spur gears 19 assist in the support of the cover plates when the arms 12 have been swung to their lowermost positions as shown to the left of Figure 2. It will therefore be apparent that the hubs of the spur gears 19 serve as abutments to limit the outward and downward swinging movement of the arms or levers 12 and assist in retaining the cover plates in spaced relation to the sides of the car box when the former are arranged in open positions thereby relieving the sides of the box from wear which would be incident to the cover plates being permitted to slide down the sides of the box. This means of preventing wear on the sides of the box is also made possible by reason of the fact that the arms 12 are pivotally connected to the ends of the cover plates intermediate their longitudinal edges as explained herein before.

While the segmental gear 15 and pinion 16 are described as being situated within the battery box, it will be obvious that the invention comprehends their arrangement outside thereof if desired.

By the devices above described, I have provided a simple and convenient mechanism whereby the cover plates may be conveniently and expeditiously moved in parallelism by a single operator to a closed position perfectly protecting the contents of the box, or to an open position in which they afford no obstruction to the inspection or adjustment of the contents of the box.

What I claim is:

1. In a battery box, the combination with a cover plate, an arm pivotally attached to each end of said plate, pivotal supports for said arms at the ends of said box, and actuating means at one end of said box to impart simultaneous movement to said arms.

2. In a battery box, the combination with a cover plate, an arm pivotally attached to each end of said plate, pivotal supports for said arms at the ends of said box, and means to impart rotative movement of said arms about said pivotal supports as and for the purpose set forth.

3. In a battery box, the combination with a cover plate, an arm pivotally attached to each end of said plate in the longitudinal central line thereof, pivotal supports for said arms at the ends of said box, and means to impart rotative movement of said arms about said pivotal supports as and for the purpose set forth.

4. In a battery box, the combination with a cover plate, of an arm pivotally attached to each end of said plate in the longitudinal central line thereof, pivotal supports for said arms at the ends of said box, and means to cause rotative effort applied at one end of the box to simultaneously rotate both arms about said pivotal supports as and for the purpose set forth.

5. In a battery box, the combination with a cover plate, of an arm pivotally attached to each end of said plate, pivotal supports for said arms at the ends of said box, a shaft extending longitudinally of said box, means to rotate said shaft, and means to connect said arms with said shaft to cause them to simultaneously swing about their pivotal supports as and for the purpose set forth.

6. In a battery box, the combination with a cover plate, of an arm pivotally attached to each end of said plate, pivotal supports for said arms at the ends of said box, a crank mounted at one end of said box, and power multiplying devices connecting said crank with both of said arms to cause their simultaneous rotation about the pivotal supports as and for the purpose set forth.

7. In a battery box having a depression, a bodily movable cover plate having a depending flange adapted to be received in said depression, and means adjacent said depression for elevating said flange over a side thereof.

8. In a battery box having a depression, an inclined surface adjacent said depression, a cover plate having a depending flange adapted to be received in said depression, and said cover plate being bodily movable and having its flange slidable upon said inclined surface.

9. In a battery box having a depression, inclined surfaces on opposite sides of a side of the depression, a cover plate having a depending flange adapted to be received in said depression, and said cover plate being bodily movable and having its flange slidable upon said inclined surface.

10. In a car, the combination with a cover, means at each end of said car connected to said cover for opening and closing the same and bringing said cover to complete state of rest upon said car when closed, and actuating means at one end of said car to impart simultaneous movement to both of said means.

11. In a car, the combination with a cover, means at each end of said car for bodily sustaining the entire weight of said cover when the latter is in open position or intermediate positions between open and closed positions, and actuating means at one end of said car to impart simultaneous movement to both of said first named means.

12. In a car, the combination with a cover, lever means at each end of said car for bodily sustaining the entire weight of said cover when the latter is in open position or intermediate positions between open and closed positions, and actuating means at one end of said car to impart simultaneous movement to both of said lever means.

13. In a car, the combination with a cover plate movable to an open position substantially parallel to the side of the car, means at each end of said car for bodily lifting and sustaining the weight of said cover plate when in open position, and actuating means at one end of said car to impart simultaneous movement to both of said first named means.

14. In a car, the combination with a closure therefor, means at each end of said car for imparting translational movement to said closure, and actuating means at one end of said car to impart simultaneous movement to both of said first named means.

15. In a car, the combination with a closure therefor, lever means at each end of said car for imparting translational movement to said closure, and actuating means at one end of said car to impart simultaneous movement to both of said lever means.

16. In a car, the combination with a closure therefor, lever means pivoted to said closure and car at each end thereof, said pivots between said lever means and closure being located inwardly of the pivots between the lever means and car whereby said closure comes to a complete state of rest upon the car when closed.

17. In a car, the combination with a closure therefor, lever means pivoted to said closure and car at each end thereof for sustaining the weight of said closure when open, and means limiting the movement of said lever means in both directions.

18. In a car, the combination with a closure therefor, lever means pivoted to said closure in the longitudinal central line thereof and to each end of said car, and means arranged in the path of said lever means for limiting opening movement thereof.

19. In a car, the combination with a closure therefor, lever means pivoted to said closure and car at each end thereof for sustaining the weight of said closure when open, and means arranged in the path of movement of said lever means as it moves in opening said closure to assist in sustaining the weight of said closure means.

20. In a car, the combination with a closure therefor, lever means pivoted to said closure in the longitudinal central line thereof and to each end of said car, and power-multiplying means for operating said lever means and arranged in the path of movement of said lever means as it moves in opening said closure to assist in sustaining the weight of said closure.

21. In a car, the combination with a closure therefor, lever means pivoted to said closure and car at each end thereof for sustaining the weight of said closure when open, and power-multiplying means for operating said lever means and including a pinion having a hub arranged in the path of movement of said lever to assist in sustaining the weight of said closure.

22. In a car, the combination with a closure, an arm pivotally connected to said closure, a shaft journalled in said car and secured to said arm, a gear keyed to said shaft and disposed within said car, a stub shaft journalled in said car and projecting interiorly and exteriorly thereof, a pinion on the interior portion of said shaft meshing with said gear, a second pinion on the exterior portion of said stub shaft, a second stub shaft carried by said car and having a pinion meshing with said exteriorly located pinion, and means for rotating said last named stub shaft.

23. In a car, the combination with a cover, an arm pivotally attached to each end of said cover and pivotally mounted at the ends of said car, and a shaft common to both of said arms for simultaneously moving them about their pivots.

24. In a battery box, a cover therefor, and means at each end of said box for imparting translational movement to said cover.

25. In a battery box, a cover therefor, and a single lever at each end of said box connected to said cover for opening and closing the same and bringing the same to a complete state of rest upon said box when closed.

26. In a battery box, a cover therefor, and a single lever at each end of said box for bodily sustaining the entire weight of said cover when the latter is in open position or intermediate positions between open and closed positions.

27. In a battery box, a cover therefor, an arm having one end pivotally attached to the middle portion of each end of said cover, and a pivotal support for the other end of each arm at each end of said box.

28. In a battery box, a closure therefor, and means pivotally connected to said closure in the longitudinal central line thereof and pivotally mounted at each end of said box.

In testimony whereof I have hereunto set my hand.

FREDERICK C. COSEO.